United States Patent
Bicerano

(10) Patent No.: US 8,492,316 B2
(45) Date of Patent: *Jul. 23, 2013

(54) METHOD FOR THE FRACTURE STIMULATION OF A SUBTERRANEAN FORMATION HAVING A WELLBORE BY USING IMPACT-MODIFIED THERMOSET POLYMER NANOCOMPOSITE PARTICLES AS PROPPANTS

(71) Applicant: Sun Drilling Products Corporation, Belle Chasse, LA (US)

(72) Inventor: Jozef Bicerano, Midland, MI (US)

(73) Assignee: Sun Drilling Products Corporation, Belle Chasse, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/630,848

(22) Filed: Sep. 28, 2012

(65) Prior Publication Data
US 2013/0045901 A1 Feb. 21, 2013

Related U.S. Application Data

(63) Continuation of application No. 13/603,277, filed on Sep. 4, 2012, which is a continuation of application No. 11/695,745, filed on Apr. 3, 2007, now Pat. No. 8,258,083, which is a continuation-in-part of application No. 11/323,031, filed on Dec. 30, 2005, now Pat. No. 7,803,740, said application No. 13/603,277 is a continuation of application No. 11/451,697, filed on Jun. 13, 2006, now abandoned.

(60) Provisional application No. 60/689,899, filed on Jun. 13, 2005, provisional application No. 60/640,965, filed on Dec. 30, 2004.

(51) Int. Cl.
*C09K 8/24* (2006.01)

(52) U.S. Cl.
USPC ............. 507/117; 166/308.1; 428/402; 264/5

(58) Field of Classification Search
CPC ........................................................ C09K 8/24
USPC .......... 507/117; 166/308.1; 428/402; 264/5
See application file for complete search history.

(56) References Cited

U.S. PATENT DOCUMENTS

2007/0066491 A1 * 3/2007 Bicerano et al. .............. 507/117

FOREIGN PATENT DOCUMENTS

WO    WO 2006072069 A2 *  7/2006

* cited by examiner

*Primary Examiner* — Alicia Toscano
(74) *Attorney, Agent, or Firm* — Morgan, Lewis & Bockius, LLP

(57) ABSTRACT

A method for fracture stimulation of a subterranean formation includes providing a thermoset polymer nanocomposite particle precursor composition comprising a polymer precursor mixture, dispersed within a liquid medium, containing at least one of an initiator; at least one of a monomer, an oligomer or combinations thereof, said monomer and oligomer having three or more reactive functionalities capable of creating crosslinks between polymer chains; at least one of an impact modifier; and nanofiller particles substantially dispersed within the liquid medium; subjecting the nanocomposite particle precursor composition to suspension polymerizing conditions; subjecting the resulting nanocomposite particles to heat treatment; forming a slurry comprising a fluid and a proppant that includes the heat-treated nanocomposite particles; injecting the slurry into a wellbore; and emplacing the proppant within a fracture network in the formation.

11 Claims, No Drawings

METHOD FOR THE FRACTURE STIMULATION OF A SUBTERRANEAN FORMATION HAVING A WELLBORE BY USING IMPACT-MODIFIED THERMOSET POLYMER NANOCOMPOSITE PARTICLES AS PROPPANTS

CROSS-REFERENCE TO RELATED APPLICATION

This application is a continuation of U.S. patent application Ser. No. 13/603,277, filed Sep. 4, 2012, which in turn is a continuation of Ser. No. 11/695,745, filed 3 Apr. 2007, (now issued as U.S. Pat. No. 8,258,083), which in turn is a continuation-in-part of U.S. patent application Ser. No. 11/323,031 entitled "Thermoset Nanocomposite Particles, Processing For Their Production, And Their Use In Oil And Natural Gas Drilling Applications", filed Dec. 30, 2005, (now issued as U.S. Pat. No. 7,803,740), which claims priority to U.S. Provisional Application No. 60/640,965 filed Dec. 30, 2004, (now expired). U.S. patent application Ser. No. 13/603,277 is also a continuation-in-part of U.S. patent application Ser. No. 11/451,697 entitled "Thermoset Particles With Enhanced Crosslinking, Processing For Their Production, And Their Use In Oil And Natural Gas Drilling Applications", filed Jun. 13, 2006, which claims priority benefit from 60/689,899, filed 13 Jun. 2005, (now expired). The contents of prior application Ser. Nos. 13/603,277, 11/695,745, 11/323,031, 11/451,697, 60/689,899 and 60/640,965 are fully incorporated herein by reference.

FIELD OF THE INVENTION

The present invention relates to a method for the fracture stimulation of a subterranean formation having a wellbore by using impact-modified ultralightweight thermoset polymer nanocomposite particles as proppants. Without reducing the generality of the invention, in its currently preferred embodiments, the thermoset polymer matrix of said particles comprises a terpolymer of styrene, ethyvinylbenzene and divinylbenzene; carbon black is used as the nano filler, suspension polymerization in the rapid rate polymerization mode is performed to prepare said particles, and post-polymerization heat treatment is performed in an unreactive gas environment to further advance the curing of the thermoset polymer matrix. One main benefit of the incorporation of impact modifier(s) is to enable the use of larger quantities of crosslinker, nano filler, or combinations thereof, in the formulation from which the particles are prepared; thus achieving higher maximum use temperatures, higher fracture conductivities throughout the use temperature range, or combinations thereof, without inducing brittleness in the particles. The fracture stimulation method of the invention can be implemented by placing said particles in the fracture either as a packed mass or as a partial monolayer. Without reducing the generality of the invention, said particles are placed as a partial monolayer in its preferred embodiments.

BACKGROUND

1. Introduction

U.S. Pat. No. 6,248,838, "Chain entanglement crosslinked proppants and related uses"; the background section of U.S. patent application Ser. No. 11/323,031 entitled "Thermoset nanocomposite particles, processing for their production, and their use in oil and natural gas drilling applications"; and the background section of U.S. patent application Ser. No. 11/451,697 entitled "Thermoset particles with enhanced crosslinking, processing for their production, and their use in oil and natural gas drilling applications", provide background information related to the present invention and are fully incorporated herein by reference. The background discussion below is intended to supplement the background discussions in these three prior filings, and focuses entirely on impact modification.

Impact modification has only been given limited and cursory consideration in prior art on fracture stimulation. U.S. Patent Application No. 20040043906 cited impact modifiers among the types of additives that can be incorporated into polymeric proppants in order to control their mechanical properties. U.S. Patent Application No. 20060078682 disclosed particles for use as proppants, where the particles comprise a substrate comprising an inorganic material, and an organic coating (disposed upon the substrate) which may optionally contain impact modifiers intended mainly to impart elastic properties to the organic coating. U.S. Pat. Nos. 5,597,784 and 6,372,678, and U.S. Patent Application Nos. 20050194141 and 20070036977, disclosed fracture stimulation technologies utilizing coated proppants comprising more than one coating layer, where a "reinforcing agent" may be interspersed at the boundary between different layers of the coating, and impact modifiers may serve as reinforcing agents.

Applicant has, however, found no prior art in the patent literature, and no publications in the general scientific literature, that disclose a method for the fracture stimulation of a subterranean formation having a wellbore by using impact-modified ultralightweight thermoset polymer nanocomposite particles as proppants. The discussion below is hence intended to be mainly of a pedagogical nature, by providing background information that will help those in the field understand the invention better by familiarizing them with key information related to impact modification. Since the preferred embodiments of the invention involve the use of thermoset nanocomposite particles having styrenic polymer matrices, this description of information related to impact modification will be done in the context of the impact modification of styrenic polymers.

2. Types of Impact-Modified Styrenic Polymers

High-impact polystyrene (HIPS) is the most commonly used impact-modified styrenic polymer. Copolymers of styrene with other suitable vinylic monomers (such as other styrenic monomers, acrylic monomers, nitrile monomers, monomers containing ion exchange capable functional groups, etc.) have also been toughened. Crosslinked versions of many of these styrenic polymers, with divinylbenzene being the most commonly used crosslinking agent, have also been toughened. Macroporous styrenic beads of various compositions (sometimes crosslinked with divinylbenzene) have also been toughened. See Conway et al. (1997) for the toughening of porous aminated crosslinked poly(vinylbenzyl chloride-divinylbenzene) beads. See Coelho et al. (2000) and World Patent No. WO9607675 for the toughening of copolymers that have been crosslinked with divinylbenzene. U.S. Pat. No. 5,847,054 teaches a method for the preparation of crosslinked styrenic polymer particles containing an impact modifier, for use as additives intended to increase the "dullness" (reduce the glossiness, make more matte) and/or enhance the impact strengths of thermoplastic and thermoset polymers when incorporated into them. U.S. Application No. 20050154083 teaches styrenic particle compositions (possibly crosslinked to a slight extent by using a small amount of a comonomer such as divinylbenzene, and possibly also containing an impact modifier) encapsulating high aspect ratio particles; and intended to be used as pigments which, when incorporated into any of a very wide variety of matrix polymers, will impart attractive optical properties to those matrix polymers.

Syndiotactic polystyrene (a highly crystalline form of polystyrene that has especially high stiffness and heat resistance, but that is even more brittle than ordinary general-purpose polystyrene) has also been toughened (U.S. Pat. Nos. 5,352,727 and 5,436,397) by incorporating impact modifiers.

Styrenic polymers containing fillers of a wide variety of types (ranging from nanoparticles to macroscopic fibers) have also been toughened. The fillers in these polymers provide functions such as reinforcement, densification and/or magnetism (as in World Patent No. WO9607675 which teaches a method for producing toughened crosslinked copolymer beads that may contain solid magnetic particles). There is some evidence that improved dispersion of solid particulate fillers can be obtained if a dispersing agent that reacts to form covalent bonds with (and thus becomes grafted onto) the matrix polymer is used.

Thermoplastic polymer blends with improved impact resistance have been obtained by mixing toughened styrenic polymers with other thermoplastic polymers of interest by techniques such as melt blending.

Toughened styrenic polymers have also been incorporated as additives in other polymers to impart some special properties to the host polymer.

While impact-modified styrenic polymers have been used in many industrial applications, applicant does not believe that these applications include the use of impact-modified styrenic polymers as proppants in the fracture stimulation of a subterranean formation having a wellbore. Nor is applicant aware of any patented or reported methods for the fracture stimulation of a subterranean formation having a wellbore by using impact-modified ultralightweight thermoset polymer nanocomposite particles based on any other type of polymeric matrix material as proppants.

3. Improvements Resulting from Impact Modification

Rubber modification is the most common method for the impact modification of styrenic polymers. It has provided up to several times higher notched Izod impact strength and much higher ductility (as quantified by the ultimate tensile elongation); without large losses in the stiffness (elastic moduli), strength, gloss, or heat distortion temperature. Increasing effectiveness of impact modification in improving the mechanical properties has been shown to correlate with increasing energy dissipation by the deformation of the rubbery phase (as quantified by its "tan δ" peak) during dynamic mechanical analysis under cyclic deformation.

See Turley and Keskkula (1980), Choi et al. (2000), Coelho et al. (2000), Aiamsen et al. (2003), Qiao-long et al. (2005), Rivera et al. (2006), U.S. Pat. Nos. 5,352,727, 5,436,397 and European Patent No. EP0475461 for some examples of the effects of rubber modification on the mechanical properties. Toyoshima et al. (1997) provide an example of the optimization of the balance between the impact strength and gloss by means of the choice of impact modifier. U.S. Pat. No. 5,475,053 teaches impact-resistant thermoplastic (including HIPS) molding compositions having a matte surface. Cho et al. (1997) show that the environmental stress cracking resistance in the simultaneous presence of a hostile chemical environment along with a mechanical load can also be improved by rubber modification.

4. Rubbers Used as Impact Modifiers for Styrenic Polymers

Many types of rubbers can be and have been used as tougheners for styrenic polymers, with varying levels of effectiveness in improving the properties, practicality of manufacturing, and economic viability in terms of the balance between improved properties and increased cost.

Polybutadiene (dissolved in the reactive monomer mixture after being placed there in a solid particulate form) is the rubbery phase that is most often incorporated as a toughener into polystyrene in order to manufacture HIPS.

Hydroxyl-terminated polybutadiene liquid rubbers have also been used. Their liquid state allows their easy incorporation (with grafting) into polystyrene, with a controlled particle size, during polymerization. See Coelho et al. (2000) for this approach.

The effects of using polybutadienes of different chain microstructure (different cis-1,4, trans-1,4, and vinyl-1,2 isomer contents) have also been investigated. For example, it has been shown by Rivera et al. (2006) that some polybutadiene microstructures provide noticeably more favorable balances between impact modification and the other mechanical properties.

Natural rubber, poly(alkyl acrylate) rubbers, partially or completely hydrogenated diene rubbers, and olefinic rubbers, are some other examples of rubbers that have been used as impact modifiers. For example, see Aiamsen et al. (2003) for the use of radiation-crosslinked natural rubber, Qiao-long et al. (2005) for the use of nanosilica-containing poly(butadiene styrene) rubber, European Patent No. EP0475461 for the use of a selectively partially hydrogenated polybutadiene, and U.S. Pat. No. 5,847,054 for the use of olefinic rubbers.

It is also worth noting that some of the terms that may be used for the different types of rubbers overlap. Sometimes, they may refer to the same type of molecular structure obtained in different ways. For example, a completely hydrogenated polybutadiene or a completely hydrogenated polyisoprene has the same general type of molecular structure as a polyolefin. Both are fully saturated aliphatic hydrocarbons. The difference is that one is obtained by polymerizing butadiene or isoprene and hydrogenating the resulting polymer; while the other is obtained directly by reacting olefinic monomers such as ethylene, propylene and/or 1-butene.

Various block copolymers (such as styrene-butadiene or styrene-isoprene diblock and styrene-butadiene-styrene or styrene-isoprene-styrene triblock copolymers and their partially hydrogenated versions) have been used either as impact modifiers on their own or as compatibilizers between polystyrene and an impact modifier such as polybutadiene. For some examples, see Conway et al. (1997), Cho et al. (1997), Toyoshima et al. (1997) and Aiamsen et al. (2003). A method using block copolymers as impact modifiers incorporated into crosslinked styrenic polymer particles is taught in U.S. Pat. No. 5,847,054. Impact-modified syndiotactic polystyrene compositions containing block copolymers are taught by U.S. Pat. Nos. 5,352,727 and 5,436,397; while U.S. Pat. Nos. 5,380,798, 5,475,053 and World Patent No. WO9607675 teach some other examples of the use of block copolymers as impact modifiers for styrenic polymers.

The rubbers used in the impact modification of styrenic polymers include both thermoset elastomers and thermoplastic elastomers. Thermoset elastomers (usually more simply referred to as "rubbers"), such as crosslinked polybutadiene and crosslinked polyisoprene, have a covalently crosslinked three-dimensional network structure, but possess a low glass transition temperature [below "room temperature" (25° C.)]. Thermoplastic elastomers, such as styrene-butadiene diblock copolymers and styrene-butadiene-styrene triblock copolymers, contain soft domains that are "physically crosslinked" by hard domains, while they lack a covalently crosslinked three-dimensional network structure. Both thermoset elastomers and thermoplastic elastomers are used simultaneously in some formulations for the impact modification of styrenic polymers. An example is the use of a crosslinked polybutadiene as the main component of the impact modifier, along with some thermoplastic styrene-butadiene diblock copolymer that serves mainly as a compatibilizer between the styrenic phase domains and the polybutadiene phase domains.

If there is a significant reactivity difference between the styrenic monomer(s) and the other type(s) of monomer(s) present in a reactive mixture, then there is a tendency towards the formation of a heterogeneous morphology [with domains rich in the styrenic polymer and domains rich in the product(s) of the polymerization of the other type(s) of monomer(s)] even when the reaction is started with a mixture of monomers rather than incorporating the non-styrenic component in an oligomeric or polymeric form. See, for example, Lu and Larock (2006). This article also illustrates the utilization of a renewable resource (corn oil) as a source of monomers for use in the preparation of polymer composites. The growing use of renewable resources as feedstocks will be discussed further in the next paragraph.

A background paper on biopolymers, published by the U.S. Congress, Office of Technology Assessment (September 1993), suggested that the use of biologically derived polymers could emerge as an important component of a new paradigm of sustainable economic systems that rely on renewable sources of energy and materials. This concept has, indeed, gained increasing acceptance in the years that followed the publication of the background paper. The utilization of monomers obtained from biological starting materials (such as amino acids, nucleotides, sugars, phenols, natural fats, oils, and fatty acids) in the chemical synthesis of polymers is an important component of this paradigm of sustainable development. This is an area of intense research and development activity because of the global drive to reduce the dependence of the world economy on petrochemical feedstocks. Such renewable feedstocks can be obtained from a wide variety of microorganism-based, plant-based, or animal-based resources. The utilization of monomers, oligomers and polymers obtained from renewable resources as components of polymer composites is, therefore, anticipated to continue to increase in the future. Among renewable feedstocks for the synthesis of polymeric products, natural fats and oils extracted from some common types of plants [such as soybean, sunflower, canola, castor, olive, peanut, cashew nut, pumpkin seed, rapeseed, corn, rice, sesame, cottonseed, palm, coconut, safflower, linseed (also known as flaxseed), hemp, castor bean, tall oil, and similar natural fats and oils; and especially soybean, sunflower, canola and linseed oils] appear to be very promising as potential sources of inexpensive monomers. Some animal-based natural fats and oils, such as fish oil, lard, neatsfoot oil and tallow oil, may also hold promise as potential sources of inexpensive monomers. U.S. Patent Application No. 20050154221 teaches integrated chemical processes for the industrial utilization of seed oil feedstock compositions. An article by Pillai (2000) discusses the wealth of high value polymers that can be produced by using constituents extracted from cashew nut shell liquid. Belcher et al. (2002) show that the blending of functionalized soybean oil with petrochemical-based resins can increase the toughness of a petroleum-based thermoset resin without compromising stiffness, while also improving its environmental friendliness.

5. Methods for Manufacturing Impact-Modified Styrenic Polymers

In toughening styrenic polymers by incorporating polybutadiene, the most common preparation method is bulk-suspension copolymerization. In applying this method, a prepolymer is first prepared by using bulk polymerization. The preparation of HIPS in the form of beads (or pellets) is then completed via suspension polymerization. It is, however, also possible to use bulk polymerization by itself, or (as taught, for example, in U.S. Pat. No. 4,730,027) suspension polymerization by itself from the beginning to the end to prepare HIPS.

Batch polymerization is most commonly used, but methods (such as the one taught in U.S. Patent Application No. 20030083450) are available for continuous polymerization.

When suspension polymerization is used (either by itself or after bulk polymerization), substantially spherical polymer beads of a wide variety of desired diameters can be produced by varying the process parameters (and especially the stirring rate).

The details of the formulation and processing conditions play crucial roles in determining the extent of grafting, as well as the size distribution and morphology of the rubbery domains. For example, the stirring (shear) rate is a process variable that has been used to control the dispersed rubbery domain size. Faster stirring normally results in smaller rubbery domain sizes. The effects of processing conditions on the morphologies of heterophasic polymeric materials (including toughened polymers and toughened polymeric composites) have been discussed by Bicerano (2002) in terms of the interplay between thermodynamic and kinetic factors.

One usually obtains thermoplastic pellets of HIPS with most of the approaches that are practiced since there is no crosslinker in the typical HIPS formulation. These thermoplastic HIPS pellets can then be melted for processing via techniques such as molding or extrusion into fabricated articles of desired shapes and sizes.

6. Optimum Incorporation of Impact Modifiers in Styrenic Polymers

There is an optimum incorporated rubber particle size. This size depends upon various factors. It typically ranges from 1 to 3 microns in diameter. See Toyoshima et al. (1997), Bicerano (2002) and Aiamsen et al. (2003) for discussions of the effects of rubber particle size.

The use of 5% to 15% by weight of polybutadiene (with 7% by weight being viewed as an optimum value by some experts) is the most common approach. However, the rubbery phase volume fraction in HIPS is typically much higher than the weight fraction of the rubber since the rubbery phase domains also normally contain a lot of occluded polystyrene. For further discussions of the optimum rubber weight fraction and/or rubbery phase volume fraction, see Turley and Keskkula (1980), Cho et al. (1997), Choi et al. (2000) and Aiamsen et al. (2003).

In general, much better impact modification is obtained if the rubbery material becomes covalently bonded to (grafted onto) the styrenic polymer chains during preparation rather than just being physically blended into the polymer. See Cho et al. (1997), Choi et al. (2000), Qiao-long et al. (2005) and Rivera et al. (2006) for examples of this effect. This is why suspension polymerization techniques, which lead to the grafting of an impact modifier containing one or more reactive functionalities onto the matrix polymer, are normally preferred to approaches such as the melt blending of a rubber into polystyrene.

A reactive impact modifier can be incorporated into the formulation as a monomer, as an oligomer, or as a polymer. The use of a reactive oligomer or polymer as the impact modifier can cause the mixing of the impact modifier into the formulation to become more difficult than the use of a monomeric impact modifier of similar chemical structure, especially if the reactive oligomer or polymer is a solid. However, once a reactive oligomer or polymer impact modifier is mixed adequately with the other components of the formulation, this approach may offer the advantage of the more facile attainment of a heterophasic morphology where the impact modifier is present in phase-separated domains that provide an optimum toughening effect with the least possible reductions of other important properties such as stiffness (modulus) and strength.

SUMMARY OF THE INVENTION

1. Introduction

The present invention relates to a method for the fracture stimulation of a subterranean formation having a wellbore by using impact-modified ultralightweight thermoset polymer nanocomposite particles as proppants.

The main ingredients of the particles are the thermoset polymer matrix (Section 2), the nanofiller which provides reinforcement (Section 3), and the impact modifier (Section 4).

Additional formulation ingredient(s) may also be used during the preparation of the particles; such as, but not limited to, initiators, catalysts, inhibitors, dispersants, stabilizers, rheology modifiers, buffers, antioxidants, defoamers, plasticizers, pigments, flame retardants, smoke retardants, or mixtures thereof. Some of these additional ingredient(s) may also become either partially or completely incorporated into the particles.

The particles are manufactured by suspension polymerization (Section 5) and postcured by heat treatment (Section 6) before being used in fracture stimulation (Section 7).

2. Matrix Polymer

Any rigid thermoset polymer may be used as the matrix polymer. Rigid thermoset polymers are, in general, amorphous polymers where covalent crosslinks provide a three-dimensional network. However, unlike thermoset elastomers (often referred to as "rubbers") which also possess a three-dimensional network of covalent crosslinks, the rigid thermosets are, by definition, "stiff". In other words, they have high elastic moduli at "room temperature" (25° C.), and often up to much higher temperatures, because their combinations of chain segment stiffness and crosslink density result in a high glass transition temperature.

For the purposes of this disclosure, a rigid thermoset polymer is defined as a thermoset polymer whose glass transition temperature, as measured by differential scanning calorimetry at a heating rate of 10° C./minute, equals or exceeds 45° C. The gradual softening of an amorphous polymer with increasing temperature accelerates as the temperature approaches the glass transition temperature. As discussed by Bicerano (2002), the rapid decline of the stiffness of an amorphous polymer (as quantified by its elastic moduli) with a further increase in temperature normally begins at roughly 20° C. below its glass transition temperature. Consequently, at 25° C., an amorphous polymer whose glass transition temperature equals or exceeds 45° C. will be below the temperature range at which its elastic moduli begin a rapid decline with a further increase in temperature, so that it will be rigid.

Some examples of rigid thermoset polymers that can be used as matrix materials in the nanocomposite particles utilized as proppants in implementing the fracture stimulation method of the invention will be provided below. It is to be understood that these examples are provided without reducing the generality of the invention, to facilitate the teaching of the invention.

Commonly used rigid thermoset polymers include, but are not limited to, crosslinked epoxies, epoxy vinyl esters, polyesters, phenolics, melamine-based resins, polyurethanes, and polyureas. Rigid thermoset polymers that are used less often because of their high cost despite their exceptional performance include, but are not limited to, crosslinked polyimides. For use in proppant particles suitable for different embodiments of the fracture stimulation method of the invention, these various types of polymers can be prepared by starting from their monomers, from oligomers that are often referred to as "prepolymers", or from combinations thereof.

Many additional types of rigid thermoset polymers can also be used. Such polymers include, but are not limited to, various families of crosslinked copolymers prepared most often by the polymerization of vinylic monomers, of vinylidene monomers, or of mixtures thereof.

The "vinyl fragment" is commonly defined as the $CH_2=CH-$ fragment. So a "vinylic monomer" is a monomer of the general structure $CH_2=CHR$ where R can be any one of a vast variety of molecular fragments or atoms (other than hydrogen). When a vinylic monomer $CH_2=CHR$ reacts, it is incorporated into the polymer as the $-CH_2-CHR-$ repeat unit. Among rigid thermosets built from vinylic monomers, the crosslinked styrenics and crosslinked acrylics are especially familiar to workers in the field. Some other familiar types of vinylic monomers (among others) include the olefins, vinyl alcohols, vinyl esters, and vinyl halides.

The "vinylidene fragment" is commonly defined as the $CH_2=CR''-$ fragment. So a "vinylidene monomer" is a monomer of the general structure $CH_2=CR'R''$ where R' and R'' can each be any one of a vast variety of molecular fragments or atoms (other than hydrogen). When a vinylidene monomer $CH_2=CR'R''$ reacts, it is incorporated into a polymer as the $-CH_2-CR'R''-$ repeat unit. Among rigid thermosets built from vinylidene polymers, the crosslinked alkyl acrylics [such as crosslinked poly(methyl methacrylate)] are especially familiar to workers in the field. However, vinylidene monomers similar to each type of vinyl monomer (such as the styrenics, acrylates, olefins, vinyl alcohols, vinyl esters and vinyl halides, among others) can be prepared. One example of particular interest in the context of styrenic monomers is alpha-methyl styrene, a vinylidene-type monomer that differs from styrene (a vinyl-type monomer) by having a methyl ($-CH_3$) group serving as the R'' fragment replacing the hydrogen atom attached to the alpha-carbon.

Thermosets based on vinylic monomers, vinylidene monomers, or mixtures thereof, are typically prepared by the reaction of a mixture containing one or more non-crosslinking (difunctional) monomer(s) and one or more crosslinking (three or higher functional) monomer(s).

The following are some specific but non-limiting examples of crosslinking monomers that can be used: Divinylbenzene, trimethylolpropane trimethacrylate, trimethylolpropane triacrylate, trimethylolpropane dimethacrylate, trimethylolpropane diacrylate, pentaerythritol tetramethacrylate, pentaerythritol trimethacrylate, pentaerythritol dimethacrylate, pentaerythritol tetraacrylate, pentaerythritol triacrylate, pentaerythritol diacrylate, bisphenol-A diglycidyl methacrylate, ethyleneglycol dimethacrylate, ethyleneglycol diacrylate, diethyleneglycol dimethacrylate, diethyleneglycol diacrylate, triethyleneglycol dimethacrylate, and triethyleneglycol diacrylate, a bis(methacrylamide) having the formula:

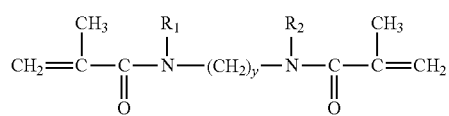

a bis(acrylamide) having the formula:

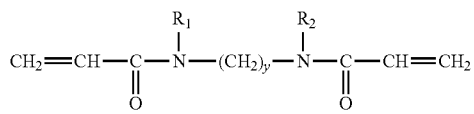

a polyolefin having the formula $CH_2=CH-(CH_2)_x-CH=CH_2$ (wherein x ranges from 0 to 100, inclusive), a polyethyleneglycol dimethylacrylate having the formula:

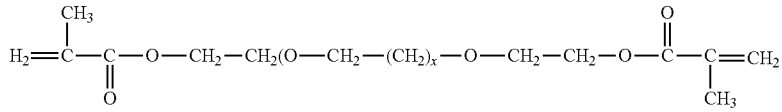

a polyethyleneglycol diacrylate having the formula:

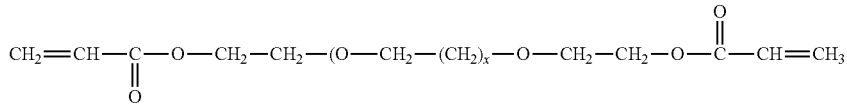

a molecule or a macromolecule containing at least three isocyanate (—N=C=O) groups, a molecule or a macromolecule containing at least three alcohol (—OH) groups, a molecule or a macromolecule containing at least three reactive amine functionalities where a primary amine (—$NH_2$) contributes two to the total number of reactive functionalities while a secondary amine (—NHR—, where R can be any aliphatic or aromatic organic fragment) contributes one to the total number of reactive functionalities; and a molecule or a macromolecule where the total number of reactive functionalities arising from any combination of isocyanate (—N=C=O), alcohol (—OH), primary amine (—$NH_2$) and secondary amine (—NHR—, where R can be any aliphatic or aromatic organic fragment) adds up to at least three, 1,4-divinyloxybutane, divinylsulfone, diallyl phthalate, diallyl acrylamide, triallyl cyanurate, triallyl isocyanurate, triallyl trimellitate or mixtures thereof.

The following are some specific but non-limiting examples of non-crosslinking monomers that can be used: Styrenic monomers, styrene, methylstyrene, ethylstyrene(ethylvinylbenzene), chlorostyrene, chloromethylstyrene, styrenesulfonic acid, t-butoxystyrene, t-butylstyrene, pentylstyrene, alpha-methylstyrene, alpha-methyl-p-pentylstyrene; acrylic and methacrylic monomers, methyl acrylate, methyl methacrylate, ethyl acrylate, ethyl methacrylate, 2-ethylhexyl acrylate, 2-ethylhexyl methacrylate, lauryl acrylate, lauryl methacrylate, glycidyl acrylate, glycidyl methacrylate, dimethylaminoethyl acrylate, dimethylaminoethyl methacrylate, hydroxyethyl acrylate, hydroxyethyl methacrylate, diethylene glycol acrylate, diethylene glycol methacrylate, glycerol monoacrylate, glycerol monomethacrylate, polyethylene glycol monoacrylate, polyethylene glycol monomethacrylate, butanediol monoacrylate, butanediol monomethacrylate; unsaturated carboxylic acid monomers, acrylic acid, methacrylic acid; alkyl vinyl ether monomers, methyl vinyl ether, ethyl vinyl ether; vinyl ester monomers, vinyl acetate, vinyl propionate, vinyl butyrate; N-alkyl substituted acrylamides and methacrylamides, N-methylacrylamide, N-methylmethacrylamide, N-ethyl acrylamide, N-ethyl methacrylamide; nitrile monomers, acrylonitrile, methacrylonitrile; olefinic monomers, ethylene ($H_2C=CH_2$) and the alpha-olefins ($H_2C=CHR$) where R is any saturated hydrocarbon fragment; vinylic alcohols, vinyl alcohol; vinyl halides, vinyl chloride; vinylidene halides, vinylidene chloride, or mixtures thereof.

3. Nanofiller

By definition, a nano filler possesses at least one principal axis dimension whose length is less than 0.5 microns (500 nanometers). Some nanofillers possess only one principal axis dimension whose length is less than 0.5 microns. Other nanofillers possess two principal axis dimensions whose lengths are less than 0.5 microns. Yet other nanofillers possess all three principal axis dimensions whose lengths are less than 0.5 microns. Any reinforcing material possessing one nanoscale dimension, two nanoscale dimensions, or three nanoscale dimensions, can be used as the nanofiller. Any mixture of two or more different types of such reinforcing materials can also be used as the nano filler. The nano filler is present in an amount ranging from 0.001 to 60 percent of the total particle by volume.

Without reducing the generality of the invention, to facilitate the teaching of the invention, we note that nanoscale carbon black, fumed silica, fumed alumina, carbon nanotubes, carbon nanofibers, cellulosic nanofibers, natural and synthetic nanoclays, very finely divided grades of fly ash, the polyhedral oligomeric silsesquioxanes; and clusters of different types of metals, metal alloys, and metal oxides, are some examples of nano fillers that can be incorporated into the nanocomposite particles used as proppants in implementing the fracture stimulation method of the invention. Since the development of nano fillers is an area that is at the frontiers of materials research and development, the future emergence of yet additional types of nano fillers that are not currently known may also be readily anticipated.

4. Impact Modifier

Thermoset nanocomposite particles possessing greater resistance to heat distortion, greater stiffness, greater environmental resistance, or combinations thereof, can be produced by incorporating larger percentages of crosslinker, nano filler, or combinations thereof, into the formulation. However, increasing the percentages of crosslinker, nanofiller, or combinations thereof, can sometimes result in the embrittlement of the particles. Embrittlement is undesirable for the use of the particles as proppants since it can cause the generation of fines when a closure stress is applied, thus causing a reduction in the flow of liquids or gases through the fracture.

The impact modifier enables the use of larger quantities of crosslinker, nano filler, or combinations thereof, in the formulation from which the particles are prepared; to achieve higher maximum use temperatures, higher fracture conductivities throughout the use temperature range, or combinations thereof, without inducing brittleness in the particles. Any mixture of two or more different types of impact modifiers may also be used as the impact modifier.

The impact modifier is present in an amount ranging from 0.1 to 65 weight percent in the mixture of the impact modifier, plus the monomer, oligomer, or combinations thereof that react to form the matrix polymer. It comprises at least one of a monomer, an oligomer or a polymer; obtained or derived from a petrochemical feedstock, a renewable feedstock, or a combination thereof Some examples will now be provided without reducing the generality of the invention.

The impact modifier may comprise at least one of a monomer, oligomer or polymer selected from the group consisting of polybutadiene (including its solid and liquid forms, and any of its variants comprising different cis-1,4, trans-1,4, and vinyl-1,2 isomer contents), natural rubber, synthetic polyisoprene, polychloroprene, nitrile rubbers, other diene rubbers, partially or completely hydrogenated versions of any of the diene rubbers, acrylic rubbers, olefinic rubbers, epichlorohydrin rubbers, fluorocarbon rubbers, fluorosilicon rubbers, block and/or graft copolymers prepared from formulations comprising styrenic monomers and diene monomers, partially or completely hydrogenated versions of block and/or graft copolymers prepared from formulations comprising styrenic monomers and diene monomers, silicone rubbers, rubbers containing aliphatic or partially aromatic polyether chain segments, rubbers containing aliphatic or partially aromatic polyester chain segments, rubbers containing aliphatic or partially aromatic polyurethane chain segments, rubbers containing aliphatic or partially aromatic polyurea chain segments, rubbers containing aliphatic or partially aromatic polyamide chain segments, ionomer resins which may be partially or wholly be neutralized with counterions; other rubbery homopolymers, copolymers containing random, block, graft, star, or core-shell morphologies, and mixtures thereof; and the monomeric or oligomeric precursors of any of the cited types of rubbery polymers.

The impact modifier may, additionally or simultaneously or alternatively, comprise at least one of a monomer, oligomer or polymer obtained or derived from renewable resources selected from the group consisting of soybean, sunflower, canola, castor, olive, peanut, cashew nut, pumpkin seed, rapeseed, corn, rice, sesame, cottonseed, palm, coconut, safflower, linseed, hemp, castor bean, tall oil, fish oil, lard, neatsfoot oil, tallow oil, and similar natural fats and oils.

Some illustrative examples will now be provided without reducing the generality of the invention. The impact modifier may be polybutadiene. It may be polybutadiene plus a styrene-butadiene diblock copolymer. It may contain an aliphatic polyester component synthesized by using monomers obtained from soybean oil in addition to containing a polybutadiene component. It may consist entirely of an aliphatic polyester that has been synthesized by using monomers obtained from petrochemical feedstocks or from soybean oil. With any of these examples, and the many other embodiments that can be readily imagined by workers skilled in the art, the impact modifier may be added into the formulation as an oligomer, as a polymer, or as a monomer which will react with the other components of the reactive mixture during the manufacture of the particles. It may also be added as any suitable combination of monomers, oligomers and/or polymers.

5. Suspension Polymerization

Any method for the fabrication of thermoset polymer nanocomposite particles known to those skilled in the art may be used to prepare the particles which are utilized as proppants in implementing the fracture stimulation method of the invention.

Without reducing the generality of the invention, it is especially practical to use methods that can produce the particles directly in the desired (usually substantially spherical) shape during polymerization from the starting monomers. A substantially spherical particle is defined as a particle having a roundness of at least 0.7 and a sphericity of at least 0.7, as measured by the use of a Krumbien/Sloss chart using the experimental procedure recommended in International Standard ISO 13503-2, "Petroleum and natural gas industries—Completion fluids and materials—Part 2: Measurement of properties of proppants used in hydraulic fracturing and gravel-packing operations" (first edition, 2006), Section 7, for the purposes of this disclosure.

Without reducing the generality of the invention, it is especially useful to produce the substantially spherical particles discussed in the paragraph above with an average diameter that ranges from 0.1 mm to 4 mm for use in fracture stimulation applications.

Without reducing the generality of the invention, suspension (droplet) polymerization, where the polymer precursor mixture is dispersed in a suitable liquid medium prior to being polymerized, is currently the most powerful manufacturing method available for accomplishing this objective. In pursuing this approach, it is especially important for the nanofiller particles to be well-dispersed within the liquid medium so that they can become intimately incorporated into the thermoset nanocomposite particles that will be formed upon polymerization.

6. Heat Treatment

If a suitable post-polymerization process step is applied to the thermoset polymer nanocomposite particles, in many cases the curing reaction will be driven further towards completion so that the maximum possible temperature at which the fracture stimulation method of the invention can be applied by using these particles will increase.

In some instances, there may also be further benefits of a post-polymerization process step. One such possible additional benefit is an enhancement in the flow of the gases, fluids, or mixtures thereof, produced by the subterranean formation towards the wellbore even at temperatures that are far below the maximum possible application temperature of the fracture stimulation method. Another such possible additional benefit is an increase of such magnitude in the resistance of the particles to aggressive environments as to enhance significantly the potential range of applications of the fracture stimulation method utilizing the particles.

Processes that may be used to enhance the degree of curing of a thermoset polymer include, but are not limited to, heat treatment (which may be combined with stirring, flow and/or sonication to enhance its effectiveness), electron beam irradiation, and ultraviolet irradiation.

Without reducing the generality of the invention, we focused mainly on the use of heat treatment as a post-polymerization process step during the manufacturing of the particles. Such heat treatment can be performed in many types of media; including a vacuum, a non-oxidizing gas, a mixture of non-oxidizing gases, a liquid, or a mixture of liquids.

It is possible, in some instances, to postcure the "as polymerized" particles adequately as a result of the elevated temperature of a downhole environment of a hydrocarbon reservoir during the application of the fracture stimulation method of the invention. However, since it does not allow nearly the same level of consistency and control of particle quality, this "in situ" approach to heat treatment is generally less preferred than the application of heat treatment as a manufacturing process step before using the particles in fracture stimulation.

7. Fracture Stimulation

The fracture stimulation method of the invention is implemented by using stiff, strong, tough, heat resistant, and environmentally resistant ultralightweight thermoset polymer nanocomposite particles. Such particles may be placed either as a proppant partial monolayer or as a conventional proppant pack (packed mass) in implementations of the invention.

The optimum mode of particle placement is determined by the details of the specific fracture that needs to be propped. In practice, the use of ultralightweight particles as proppant particles in implementing the fracture stimulation method of the invention provides its greatest advantages in situations where a proppant partial monolayer is the optimum mode of placement. Furthermore, the development of the fracture stimulation method of the invention has resulted in partial monolayers becoming the optimum proppant placement method in many situations where the use of partial monolayers was either impossible or impractical with previous technologies.

In any case, the method for fracture stimulation comprises (a) forming a slurry comprising a fluid and a proppant, (b) injecting this slurry into the wellbore at sufficiently high rates and pressures such that the formation fails and fractures to accept the slurry, and (c) thus emplacing the proppant in the formation so that it can prop open the fracture network (thereby allowing produced gases, fluids, or mixtures thereof, to flow towards the wellbore).

The most commonly used measure of proppant performance is the conductivity of liquids and/or gases (depending on the type of hydrocarbon reservoir) through packings of the particles. A minimum liquid conductivity of 100 mDft is often considered as a practical threshold for considering a packing to be useful in propping a fracture that possesses a given closure stress at a given temperature. In order for a fracture stimulation method to have significant practical utility, a static conductivity of at least 100 mDft must be retained for at least 200 hours at a temperature greater than 80° F. It is a common practice in the industry to use the simulated environment of a hydrocarbon reservoir in evaluating the conductivities of packings of particles. The API RP 61 method, described by a publication of the American Petroleum Institute titled "Recommended Practices for Evaluating Short Term Proppant Pack Conductivity" (first edition, Oct. 1, 1989), is currently the commonly accepted testing standard for conductivity testing in the simulated environment of a hydrocarbon reservoir. As of the date of this filing, however, work is underway to develop alternative testing standards, such as International Standard ISO 13503-5, "Petroleum and natural gas industries—Completion fluids and materials—Part 5: Procedures for measuring the long-term conductivity of proppants" (final draft, 2006).

DESCRIPTION OF THE PREFERRED EMBODIMENTS

Details will now be provided on the currently preferred embodiments of the invention. These details will be provided without reducing the generality of the invention. Persons skilled in the art can readily imagine many additional embodiments that fall within the full scope of the invention as taught in the SUMMARY OF THE INVENTION section.

The fracture stimulation method of the invention is preferably implemented by placing the ultralightweight thermoset polymer nanocomposite particles in the fracture as a partial monolayer. We have found, under standard laboratory test conditions, that the use of particles of narrow size distribution such as 14/16 U.S. mesh size ((diameters in the range of 1.19 to 1.41 millimeters) is more effective than the use of broad particle size distributions. We have also found, under standard laboratory test conditions, that 0.02 lb/ft$^2$ is an especially preferred level of coverage of the fracture area with a partial mono layer of thermoset nanocomposite particles of sufficient stiffness and strength that possess an absolute density of 1.054. However, real-life downhole conditions in an oilfield may differ significantly from those used under laboratory test conditions. Consequently, in the practical application of the fracture stimulation method of the invention, the use of other particle size distributions, other coverage levels, or combinations thereof, may be more appropriate, depending on the conditions prevailing in the specific downhole environment where the fracture stimulation method of the invention will be applied.

The thermoset polymer matrix consists of a terpolymer of styrene (S), ethyvinylbenzene (EVB) and divinylbenzene (DVB). The current preference for the use of such terpolymers instead of copolymers of S and DVB is a result of economic considerations related to monomer costs. DVB, which functions as a crosslinker, is present in an amount ranging from 3% to 35% by weight of the reactive monomer mixture of the preferred embodiments.

Carbon black, possessing a length that is less than 0.5 microns in at least one principal axis direction, is used as the nanofiller at an amount ranging from 0.1% to 15% of the total particle by volume.

An impact modifier that has one or more reactive functionalities capable of causing the impact modifier to become grafted onto the thermoset polymer matrix is preferred. The impact modifier is incorporated in an amount ranging from 3 to 35 percent by weight in the mixture of the impact modifier, plus the S, EVB and DVB monomers that react to form the matrix polymer. A polymer additive grade of polybutadiene, sold as a solid, is dissolved in the organic phase of the suspension used in the suspension polymerization process, and becomes grafted onto the thermoset polymer matrix as a rubbery phase when polymerization forms the S-EVB-DVB terpolymer matrix. A block copolymer may also be used in some embodiments, usually mainly serving as a compatibilizer between the styrenic matrix and the polybutadiene-rich rubbery domains but sometimes also providing additional impact modification of its own.

Suspension polymerization in its "rapid rate polymerization" mode is performed to prepare the particles. The most important additional formulation ingredient (besides the reactive monomers and the impact modifier) that is used during polymerization is the initiator. The initiator may consist of one type molecule or a mixture of two or more types of molecules that have the ability to function as initiators. We have found with experience that the "dual initiator" approach, involving the use of two initiators which begin to manifest significant activity at different temperatures, often provides the best results.

Additional formulation ingredients, such as catalysts, inhibitors, dispersants, stabilizers, rheology modifiers, buffers, antioxidants, defoamers, plasticizers, pigments, flame retardants, smoke retardants, or mixtures thereof, may also be used when needed. Some of the additional formulation ingredient(s) may become either partially or completely incorporated into the particles in some embodiments of the invention.

The suspension polymerization conditions are selected such that the particles to be used in the fracture stimulation method of the invention are selectively manufactured to have the vast majority of them fall within the 14/40 U.S. mesh size range (diameters in the range of 0.42 to 1.41 millimeters). The particles are sometimes separated into fractions having narrower diameter ranges for use in an optimal manner in proppant partial mono layers.

Post-polymerization heat treatment in an unreactive gas environment is performed as a manufacturing process step to further advance the curing of the thermoset polymer matrix. This approach works especially well (without adverse effects such as degradation that could occur if an oxidative gaseous environment such as air were used and/or swelling that could occur if a liquid environment were used) in enhancing the curing of the particles. The particles undergo a total exposure to temperatures in the range of 150° C. to 200° C. for a duration of 10 minutes to 90 minutes, inclusive, in an unreactive gas environment. The specific selection of an optimum temperature and duration of heat treatment within these ranges depends on the formulation from which the particles were prepared. Nitrogen is used as the unreactive gas environment.

EXAMPLES

Some theoretical examples of preferred embodiments of the fracture stimulation method of the invention will now be given, without reducing the generality of the invention, to provide a better understanding of some of the ways in which the invention may be practiced. Workers skilled in the art can readily imagine many other embodiments of the invention with the benefit of this disclosure. Some comparative examples will also be given of embodiments that do not meet a key requirement of the invention and hence are not expected to perform adequately.

Example 1

The fracture stimulation method of the invention is applied in a situation where it will provide the maximum possible benefit as compared with prior fracture stimulation methods. The downhole environment is one where the use of a proppant partial monolayer would be very effective in the extraction of hydrocarbons from a reservoir but has not been practical previously because of the unavailability of proppant particles of near neutral buoyancy in water along with sufficient stiffness, strength and environmental resistance. The ultralightweight thermoset polymer nanocomposite particles used in implementing the fracture stimulation method of the invention overcome this difficulty. Detailed consideration of the downhole environment results in the determination that 14/16 U.S. mesh size particles would be optimal. Particles in this size range are placed into the fracture as a partial monolayer by using slickwater as the carrier fluid.

The thermoset polymer matrix of the nanocomposite particles used in this example consists of a terpolymer of styrene (S), ethyvinylbenzene (EVB) and divinylbenzene (DVB). The quantities of these three monomers in the reactive monomer mixture are 68.73% S, 11.27% EVB and 20% DVB by weight. However, the complete polymer also contains 10% of an "impact modifier" grade of polybutadiene by weight in the mixture of the total amount of impact modifier and styrenic monomers. Relative to this total amount, the quantities of the main ingredients of the polymer are 61.86% S, 10.14% EVB, 18% DVB and 10% polybutadiene. In addition, the particle contains 1% by volume of carbon black as a nanofiller. The particles are prepared by rapid rate suspension polymerization. They are then postcured in a nitrogen environment for 20 minutes at a temperature of 185° C.

Example 2

The same types of particles are used as in Example 1. However, detailed consideration of the downhole environment shows that an the use of the full available 14/40 U.S. mesh size range of the particles will be optimal. Particles in this size range are placed into the fracture by using slickwater as the carrier fluid.

Example 3

It is determined, by detailed consideration of the downhole environment, that the use of particles in the 16/30 U.S. mesh size and the transport of these particles into the fracture by using slickwater as the carrier fluid will be optimal.

It is also determined that, since this particular hydrocarbon reservoir is deeper than the one considered in Example 1, the proppant pack will need to be able to withstand both a significantly higher closure stress and a significantly higher temperature than in Example 1. These factors result in the need to use thermoset polymer nanocomposite particles prepared from a formulation containing both a larger amount of crosslinker and a larger amount of nanofiller. The use of a larger total amount of impact modifier, including a compatibilizer, overcomes the increased tendency towards embrittlement resulting from the use of larger quantities of crosslinker and nanofiller. The post-polymerization heat treatment is also applied in a more vigorous manner in order to approach full cure with the formulation used in these particles.

More specifically, the quantities of the three monomers in the reactive monomer mixture are 53.09% S, 16.91% EVB and 30% DVB by weight. However, the complete polymer also contains 10% of an "impact modifier" grade of polybutadiene plus 3% of a styrene-butadiene diblock copolymer by weight in the mixture of the total amount of impact modifier and the styrenic monomers. The total of the two components of the impact modifier thus amounts to 13% of the total amount of impact modifier and styrenic monomers. Relative to this total amount, the quantities of the main ingredients of the polymer are 46.19% S, 14.71% EVB, 26.10% DVB, 10% polybutadiene, and 3% styrene-butadiene diblock copolymer. In addition, the particle contains 1.5% by volume of carbon black as a nanofiller. The particles are prepared by rapid rate suspension polymerization. They are then postcured in a nitrogen environment for 30 minutes at a temperature of 195° C.

Comparative Example 1

As in Example 1, except that an impact modifier is not included. The particles are stiff and strong, but brittle. Their brittleness causes them to be inadequate for use in a proppant pack in the implementation of the fracture stimulation method of the invention.

Comparative Example 2

As in Example 3, except that an impact modifier is not included. The particles are stiff and strong, but brittle. Their brittleness causes them to be inadequate for use in a proppant pack in the implementation of the fracture stimulation method of the invention.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed:

1. An impact modified nanocomposite spherical bead comprising:
    a polymer matrix, wherein said polymer matrix comprises a styrene-divinylbenzene copolymer or a styrene-ethylvinylbenzene-divinylbenzene terpolymer;
    from 0.1 to 65 weight percent of a polymeric impact modifier; and
    from 0.001 to 60 volume percent of nanofiller particles possessing a length that is less than 0.5 microns in at least one principal axis direction;
    said nanofiller particles comprising at least one of dispersed fine particulate material, fibrous material, discoidal material, or a combination of such materials, and wherein said nanofiller particles are selected from the group of nanofillers consisting of: carbon black, fumed silica, fumed alumina, carbon nanotubes, carbon nanofibers, cellulosic nanofibers, fly ash, polyhedral oligomeric silsesquioxanes, or mixtures thereof,
    wherein said nanofiller particles are dispersed throughout the impact modified nanocomposite spherical bead, wherein said impact modified nanocomposite spherical bead has a diameter ranging from 0.1 mm to 4 mm, and wherein said impact modified nanocomposite spherical bead has about neutral buoyancy relative to water.

2. The impact modified nanocomposite of claim 1, wherein said polymer matrix comprises a rigid thermoset polymer selected from the group consisting of cross-linked epoxies, epoxy vinyl esters, polyesters, phenolics, melamine-based resins, polyurethanes, cross-linked polyimides, and polyureas.

3. The modified nanocomposite of claim 1, wherein said polymer matrix comprises a rigid thermoset polymer selected from cross-linked copolymers prepared by the polymerization of vinylic monomers, of vinylidene monomers, or of mixtures thereof.

4. The modified nanocomposite of claim 1, wherein said polymeric impact modifier comprises at least one of a monomer, oligomer or polymer selected from the group consisting of solid, liquid and isomer variants of polybutadiene, natural rubber, synthetic polyisoprene, polychloroprene, nitrile rubbers, other diene rubbers, partially or completely hydrogenated versions of any of the diene rubbers, acrylic rubbers, olefinic rubbers, epichlorohydrin rubbers, fluorocarbon rubbers, fluorosilicon rubbers, block and/or graft copolymers prepared from formulations comprising styrenic monomers and diene monomers, partially or completely hydrogenated versions of block and/or graft copolymers prepared from formulations comprising styrenic monomers and diene monomers, silicone rubbers, rubbers containing aliphatic or partially aromatic polyether chain segments, rubbers containing aliphatic or partially aromatic polyester chain segments, rubbers containing aliphatic or partially aromatic polyurethane chain segments, rubbers containing aliphatic or partially aromatic polyurea chain segments, rubbers containing aliphatic or partially aromatic polyamide chain segments, ionomer resins which may be partially or wholly be neutralized with counterions; other rubbery homopolymers, copolymers containing random, block, graft, star, or core-shell morphologies, and mixtures thereof; and the monomeric or oligomeric precursors of any of the cited types of rubbery polymers.

5. The modified nanocomposite of claim 1, wherein said polymeric impact modifier comprises polybutadiene.

6. The modified nanocomposite of claim 1, wherein said polymeric impact modifier comprises polybutadiene and a styrene-butadiene diblock copolymer.

7. The modified nanocomposite of claim 1, wherein said polymeric impact modifier comprises an aliphatic polyester component synthesized by using monomers obtained from soybean oil in addition to containing a polybutadiene component.

8. The modified nanocomposite of claim 1, wherein said nanofiller particles comprise carbon in an amount ranging from 0.1% to 15% of the total volume percent of said nanofiller particles.

9. The modified nanocomposite of claim 1, wherein said polymer matrix is post- polymerization heat treated in an unreactive gas environment to further advance the curing of said thermoset polymer matrix.

10. The modified nanocomposite of claim 9, wherein said post-polymerization heat treatment is performed at a temperatures ranging from 150° C. to 200° C.

11. The modified nanocomposite of claim 9, wherein said post-polymerization heat treatment is performed for a duration of from 10 minutes to 90 minutes.

* * * * *